(12) United States Patent
Drucker

(10) Patent No.: US 6,305,878 B1
(45) Date of Patent: Oct. 23, 2001

(54) ADJUSTABLE DEPTH AIR SPARGING WELL

(75) Inventor: Andrew Scott Drucker, Thousand Oaks, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/541,479

(22) Filed: Apr. 3, 2000

(51) Int. Cl.$^7$ .......................................................... B09C 1/02
(52) U.S. Cl. ................. 405/128.25; 405/128.15; 405/128.45; 166/387; 166/311; 166/188; 166/242.2; 210/170
(58) Field of Search ........................... 405/128.1, 128.15, 405/128.2, 128.25, 128.3, 129.57, 129.7; 166/372, 387, 311, 106, 188, 242.2; 210/170, 747

(56) References Cited

U.S. PATENT DOCUMENTS

| | | | |
|---|---|---|---|
| 5,348,420 | * | 9/1994 | Bernhardt ......................... 405/128.25 |
| 5,389,267 | * | 2/1995 | Gorelick et al. ................. 405/128.25 |
| 5,577,558 | * | 11/1996 | Abdul et al. ....................... 405/128.2 |
| 5,855,775 | * | 1/1999 | Kerfoot ............................ 405/128.25 |
| 5,879,108 | * | 3/1999 | Haddad ............................ 405/128.25 |
| 6,109,358 | * | 8/2000 | McPhee et al. .................. 405/128.25 |
| 6,174,107 | * | 1/2001 | Martinell ......................... 405/128.25 |
| 6,174,108 | * | 1/2001 | Suthersan ........................ 405/128.15 |

* cited by examiner

Primary Examiner—David Bagnell
Assistant Examiner—Frederick L. Lagman
(74) Attorney, Agent, or Firm—David Kalmbaugh

(57) ABSTRACT

An adjustable depth air sparging well comprising a flow through packer which is slidably mounted within a well casing allowing for vertical movement of the flow through packer within the well casing. Flow through packer includes an inflatable packer fabricated from inflatable vitron tubing, a lower end portion of an air supply tube which has a plurality of openings for providing pressurized air to inflate the packer, and a pair of vitron rubber packer end caps. An air compressor is coupled to the air supply tube supplying pressurized air to the inflatable packer which inflates the packer holding the packer at a fixed depth within the well casing. Deflating the inflatable packer allows for vertical movement of the inflatable packer within the well casing. Positioned at the lower end of the air supply tube is a one way valve through which air under pressure passes to a well screen. The well screen, which comprises the lower portion of the well casing, is mounted in the soil's saturated zone. The pressurized air next passes through the well screen into the soil's saturation zone removing volatile contaminants and transferring the contaminants to the soil's vadoze zone.

14 Claims, 7 Drawing Sheets ary system, designated generally by the reference
ADJUSTABLE DEPTH AIR SPARGING WELL

BACKGROUND OF THE INVENTION

1. Field of the Invention

The present invention relates generally to a system for removing environmentally harmful volatile containments from saturated or groundwater regions of the soil subsurface. More particularly, the present invention relates to an adjustable depth air sparging well which uses injected air to remove volatile containments from the saturated or groundwater regions of the soil subsurface.

2. Description of the Prior Art

Air sparging is a relatively recent and a very innovative technology that uses air injected under pressure to remove environmentally harmful volatile contaminants. Air sparging systems are capable of removing volatile contaminants such as gasoline, certain solvents and jet fuels from the groundwater region of the soil subsurface. In particular, air sparging systems are used to remove residual source contamination, clean up dissolved phase contamination, and contain a migrating contaminant plume.

Referring to FIG. 1, the major components of an air sparging system, designated generally by the reference numeral 18, (as shown in FIG. 1) consist of a permanently installed, vertical, single depth air sparge well 20, an air blower or compressor 22 which supplies air under pressure to sparge well 20 and monitoring sensors and equipment (not illustrated in FIG. 1). A screened bottom portion 24 of the air sparging system 20 is located below the contamination level 27. Air under pressure is injected through the screened bottom portion 24 of system 20 into the soil's saturated zone 28. This injected air strips the contaminants from a liquid phase to a vapor phase, and then transports the contaminants via air channels 30 to the soil's vadoze zone 32 for removal from the vadoze zone 32.

Referring to FIG. 2, clay soils and highly stratified layers, represented generally by the reference numeral 34, limit the effectiveness of air sparging systems 18 of the type illustrated in FIG. 1 by significantly decreasing uniform air distribution throughout soil's saturated zone 28. As shown in FIG. 2, the air channels 36 are not uniformly distributed throughout the soil's saturated zone 28, resulting in areas of the saturated zone 28 from which volatile contaminants can not be removed. In particular, injected air will not penetrate the clay soils and highly stratified layers 34, which leaves the volatile contaminants in the region 29 above the clay soils and highly stratified layers 34 in the saturated zone.

Nested air sparge wells have been used as an alternative to vertical sparge wells to remove volatile contaminants when the soil is highly stratified. Nested air sparge wells are costly due to the drilling cost associated with these wells.

A second alternative is to place vertical sparge wells adjacent to one another for uniform injection of air within the soil which will generally result in significant cost increases, while not assuring complete success at stratified sites within a contaminated saturated zone.

In addition, once nested or adjacent air sparge wells are installed, there is currently no method to adjust the sparging depth to assure that volatile contaminates are completely removed from contaminated saturated zones of the type illustrated in FIG. 2.

Accordingly, there is a need for an adjustable depth air sparge well which will allow for the removal of environmentally harmful volatile contaminants from saturated or groundwater regions of the soil, especially where stratification is a significant problem. In addition, there is a need to provide an adjustable depth air sparge well which is relatively simple in design and provides for significant operational cost reduction over air sparging systems currently in use.

SUMMARY OF THE INVENTION

The present invention overcomes some of the disadvantages of the prior art including those mentioned above in that it comprises a relatively simple design yet highly efficient and effective system which uses injected air for the removal of environmentally harmful volatile containments from the saturated or groundwater regions of the soil.

The adjustable depth air sparging well system comprises a flow through packer which is slidably mounted within a well casing allowing for vertical movement of the flow through packer within the well casing.

The flow through packer includes an inflatable packer fabricated from inflatable vitron tubing, a lower end portion of an air supply tube which has a plurality of openings for providing pressurized air to inflate the packer, and a pair of vitron rubber packer end caps. An air compressor is coupled to the air supply tube supplying pressurized air to inflate the packer. Deflating the inflatable packer allows for verticle movement of the inflatable packer within the well casing.

Positioned at the lower end of the air supply tube is a one way valve through which air under pressure passes to a well screen. The well screen comprises the lower portion of the well casing that is in contact with the soil's saturated zone. The pressurized air next passes through the well screen into the soil's saturation zone removing volatile contaminants and transferring the contaminants to the soil's vadoze zone.

DETAILED DESCRIPTION OF THE PREFERRED EMBODIMENT

Figure 1:
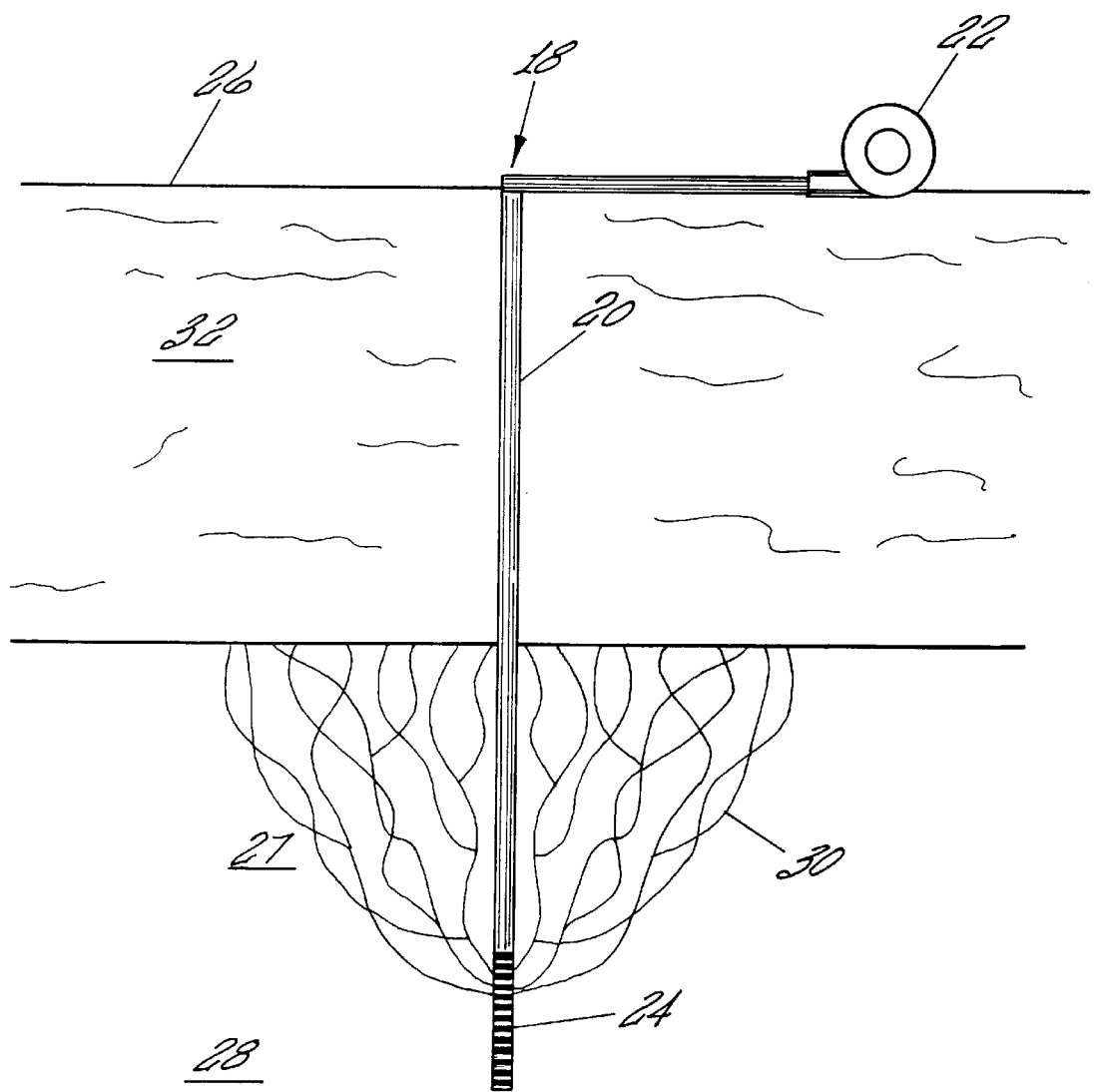
FIG. 1 illustrates a conventional vertical air sparge well for removing environmentally harmful volatile contaminants from saturated regions of the soil wherein the saturation zone is homogenous.

The preferred embodiment of the present invention will now be discussed in some detail in conjunction with all of the figures of the drawing, wherein like parts are designated by like reference numerals, insofar as it is possible and practical to do so.

Figure 2:
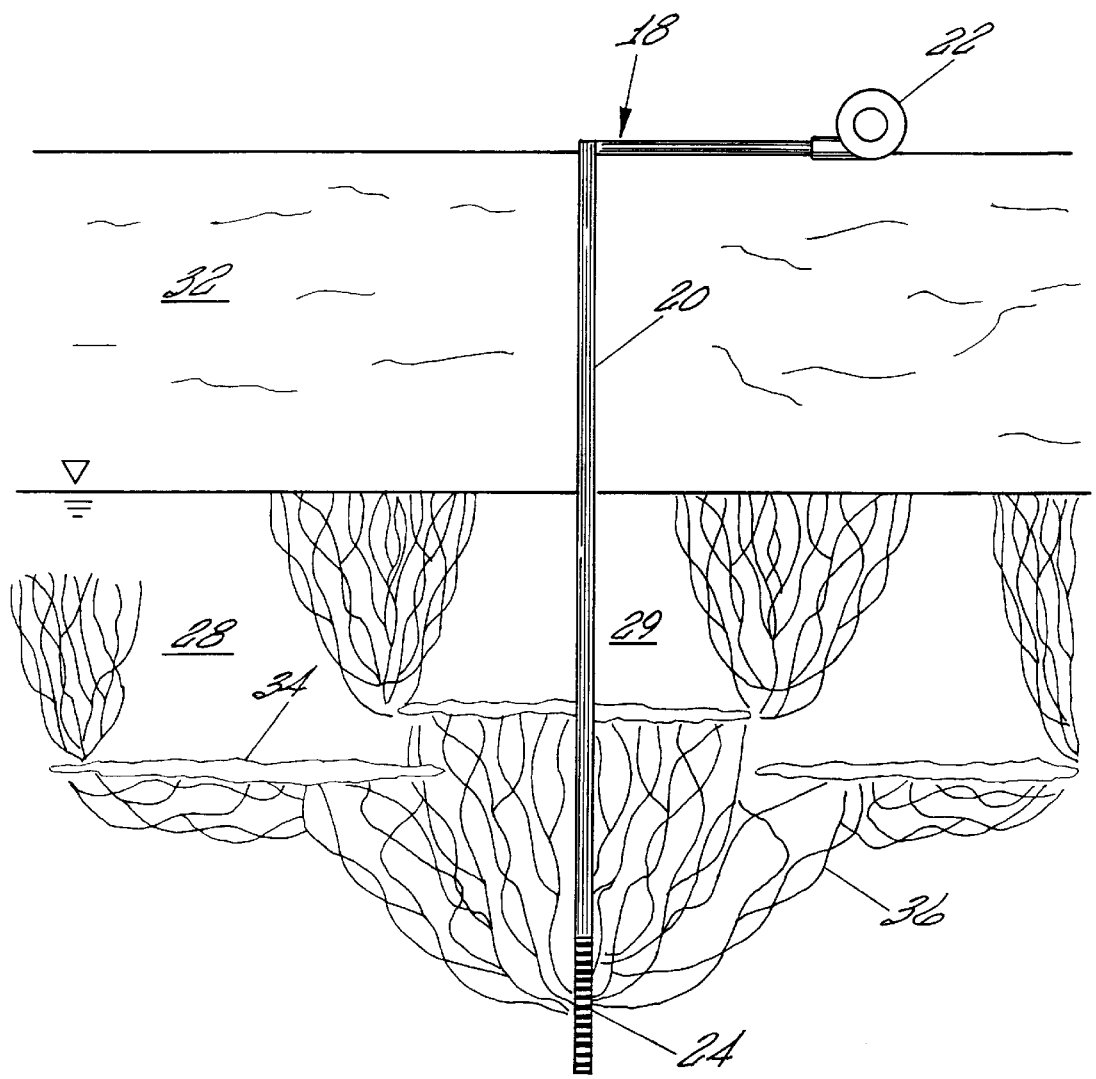
FIG. 2 illustrates a conventional vertical air sparge well for removing environmentally harmful volatile contaminants from saturated regions of the soil wherein the saturated zone is stratified.
Figure 3:
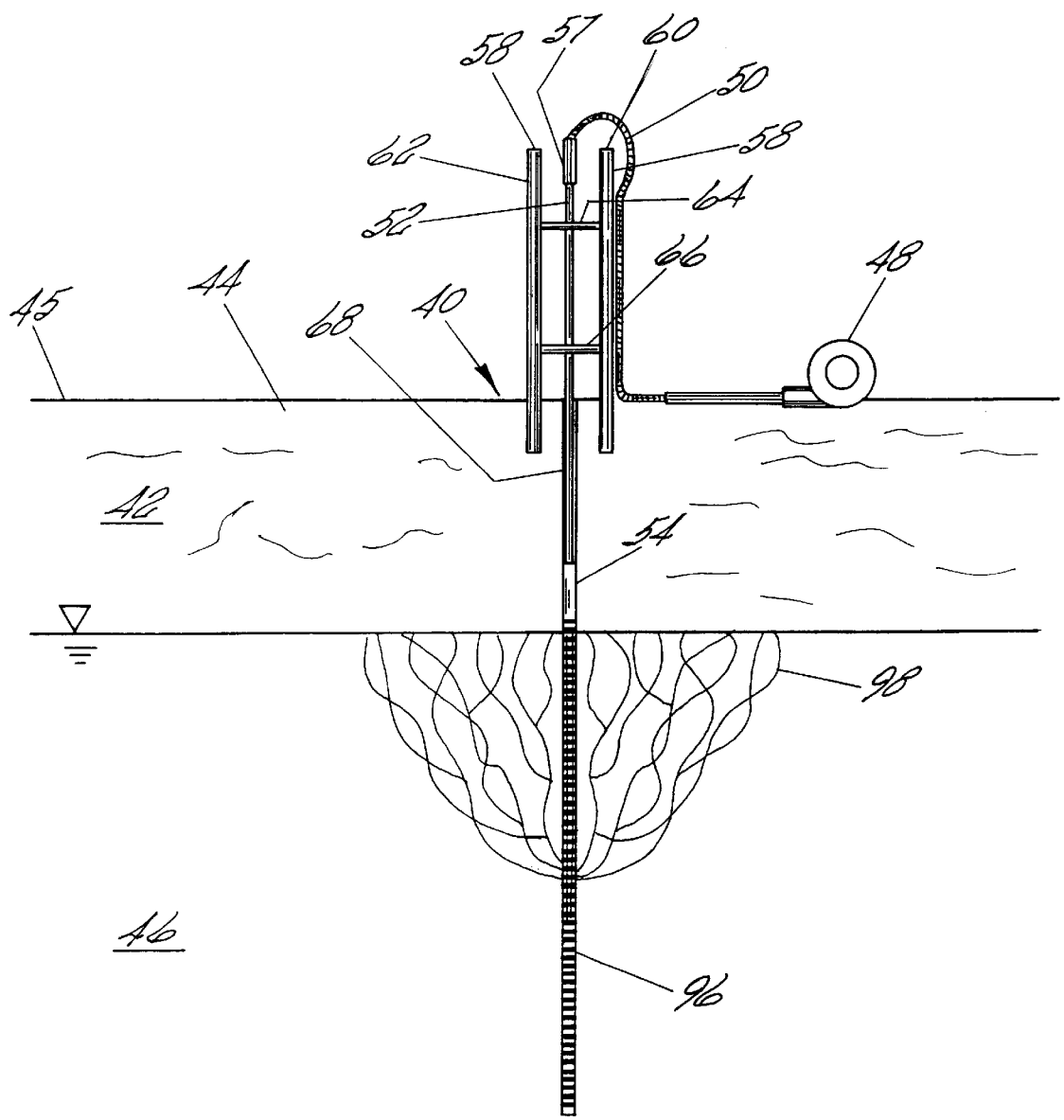
FIG. 3 illustrates an adjustable depth air sparging well for removing environmentally harmful volatile contaminants from saturated regions of the soil wherein the saturated zone is homogenous which constitutes the present invention.
Figure 4:
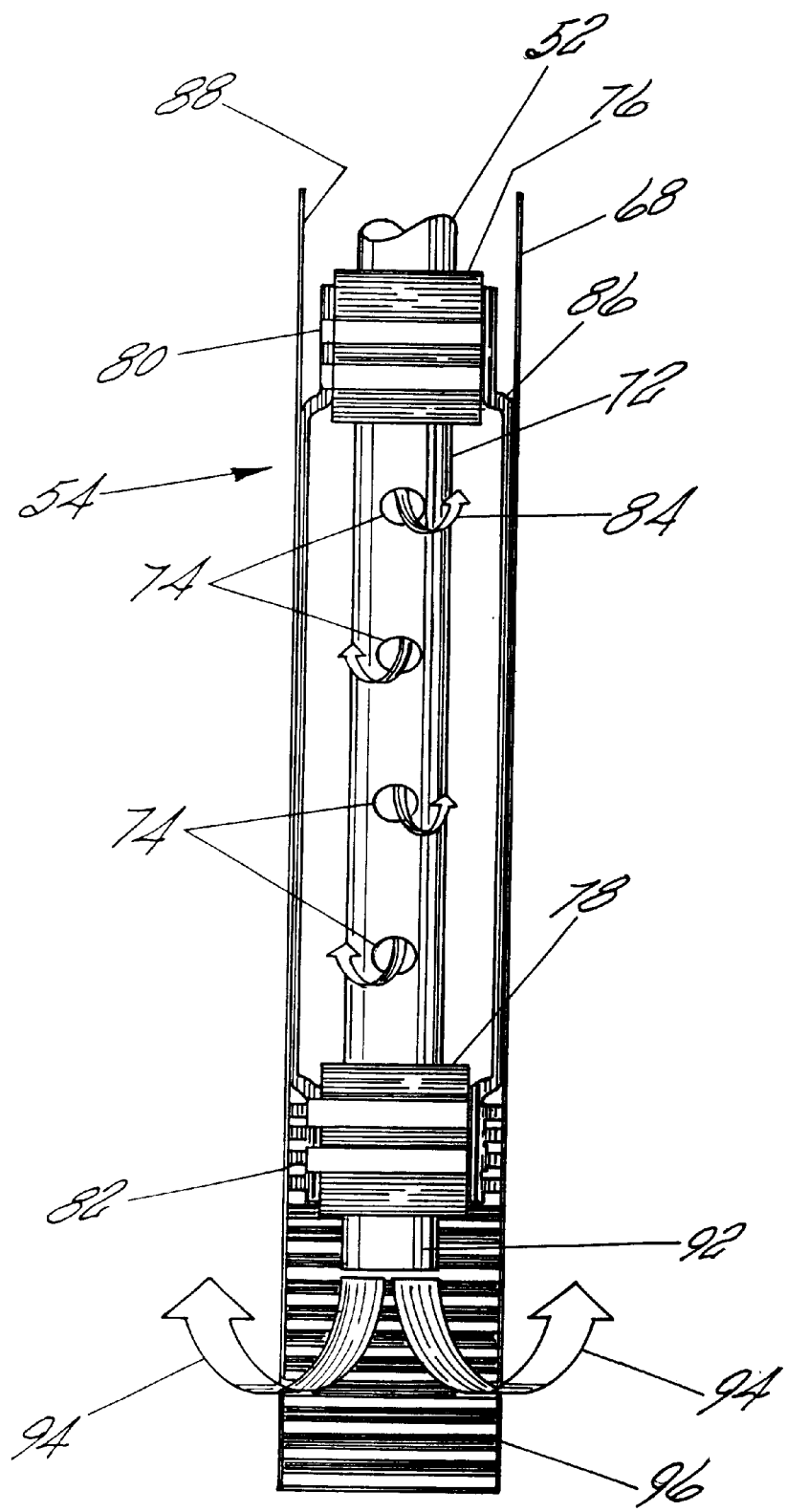
FIG. 4 is a detailed view illustrating the flow through air sparge packer for the adjustable depth air sparging well of FIG. 3.

Referring to FIGS. 3 and 4, there is shown an adjustable depth air sparging well, designated generally by the reference numeral 40, which is vertically positioned and passes through the vadoze zone 42 of the soil 44 to the saturated zone 46 of the soil 44. It should be noted that the saturated zone 46 of the soil 44 is homogeneous without the stratification 34 illustrated in FIG. 2.

Adjustable depth air sparging well 40 comprises an air blower 48 which supplies pressurized air via a flexible air supply tube 50 and a flow through packer air supply tube 52 to an adjustable depth flow through air sparge packer 54 and pipe coupling 57 is used to connect tubes 50 and 52. Blower 48 is capable of supplying pressurized air at flow rates of between 5 scfm and 40 scfm to air sparge packer 54 and screened well 96 which is that portion of well casing 68 extending into the soil's saturated zone 46.

There is also provided a support structure 58 for the flow through packer air supply tube 52 which includes a pair of vertical support members 60 and 62 and a pair of cross braces 64 and 66 affixed to support members 60 and 62. Support structure 58 is designed to allow for adjustment of the depth of flow through packer air supply tube 52 which in turn allows adjustable depth air sparging well 40 to be positioned at various depths within the soil's saturation zone 46.

Referring to FIG. 4, flow through air sparge packer 54 is slidably mounted or positioned within a well casing 68 allowing for vertical movement of sparge packer 54 within well casing 68. As shown in FIG. 3 well casing 68 extends from the soil's surface 45 the vadoze zone 42 into the saturated zone 46 from which volatile contaminants are to be removed.

Flow through air sparge packer 54 comprises an inflatable packer fabricated from inflatable vitron tubing, a lower end portion 72 of air supply tube 52 which has a plurality of openings 74, and a pair of vitron rubber packer end caps 76 and 78. Packer end cap 76 is secured to one end of lower end portion 72 by a first stainless steel strapping 80, while packer end cap 78 is secured to the other end of lower end portion 72 by a second stainless steel strapping 82. Stainless steel strappings 80 and 82 respectively seal end caps 76 and 78 to packer air supply tube 52 in the manner illustrated in FIG. 4.

When air under pressure passes through openings 74 (in the manner indicated by arrows 84) the outer surface 86 of inflatable packer 54 presses against the inner surface 88 of well casing 68 which holds adjustable depth flow through air sparge packer 54 in a fixed position within well casing 68. When inflatable packer 54 is not under pressure, inflatable packer 54 deflates which allows for vertical movement of adjustable depth flow through air sparge packer 54 within well casing 68. When inflatable packer 54 is inflated a seal is formed which prevents injected air from reentering the well casing 68 and subsequently short circuiting air flow through the contaminated regions of the soil's saturation zone 46.

At this time it should be noted that flow through packer air supply tube 52 has an outside diameter of 0.5–1.0 inches, while well casing has an inside diameter of 1.0–2.5 inches. It should also be noted that vitron rubber was selected for inflatable packer 54 and end caps 76 and 78 since this material has excellent petroleum resistant properties.

Positioned at the lower end of flow through packer air supply tube 52 is a one way valve 92 through which air under pressure passes in the manner depicted by arrows 94. The pressurized air next passes through a well screen 96 (also depicted by arrows 94) into the soil's saturated zone 46.

As the vitron tubing inflates, pressure within inflatable packer 54 will rise until pore and hydrostatic pressures associated with the injection depth of adjustable depth air sparging well 40 are overcome. Once these pressures are overcome, air will flow out the one way valve 92 of inflatable packer 54 through well screen 96 into the contaminated aquifer or saturated zone 46. Air flow within saturated zone 46 is depicted in FIG. 3 as being through air channels 98.

Figure 5:
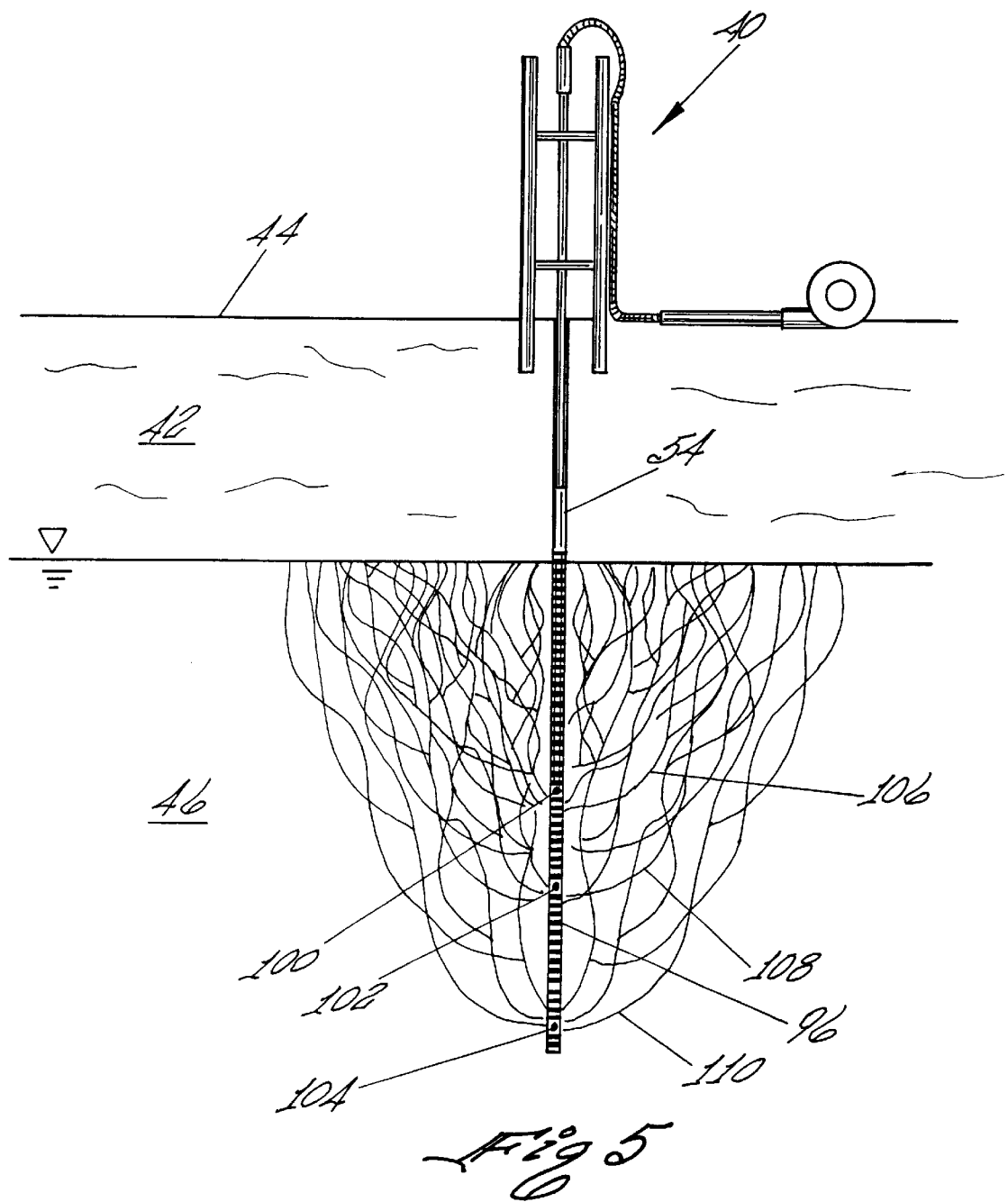
FIG. 5 illustrates the flow through the air sparge packer of FIG. 4 at a plurality of injection depths.

Referring to FIGS. 4 and 5, once it has been determined that a sufficient volume of air has been injected by adjustable depth air sparging well 40 into saturated zone 46 at a particular depth, adjustable depth flow through air sparge packer 54 may be moved to a new depth within the saturated zone 46. This requires the operator to turn off blower 48 deflating packer 54 which allows for adjustment of the depth of air sparging packer 54 within the soil's saturated zone 46. In FIG. 5, the air sparging packer 54 including one way valve 92 is depicted at three different injection points generally referenced by numerals 100, 102 and 104. This results in a high density air distribution network consisting of air channels 106 (associated with injection point 100); air channels 108 (associated with injection point 102); and air channels 110 (associated with injection point 104) covering the contaminated area within the soil's saturated zone 46 with injected air removing volatile contaminants from the soil's saturated zone 46.

The benefit of injecting air at three different points 100, 102 and 104 is to increase overall air channel density and therefore promote quicker and more thorough volatile contaminant removal from the soil's saturated zone.

Figure 6:
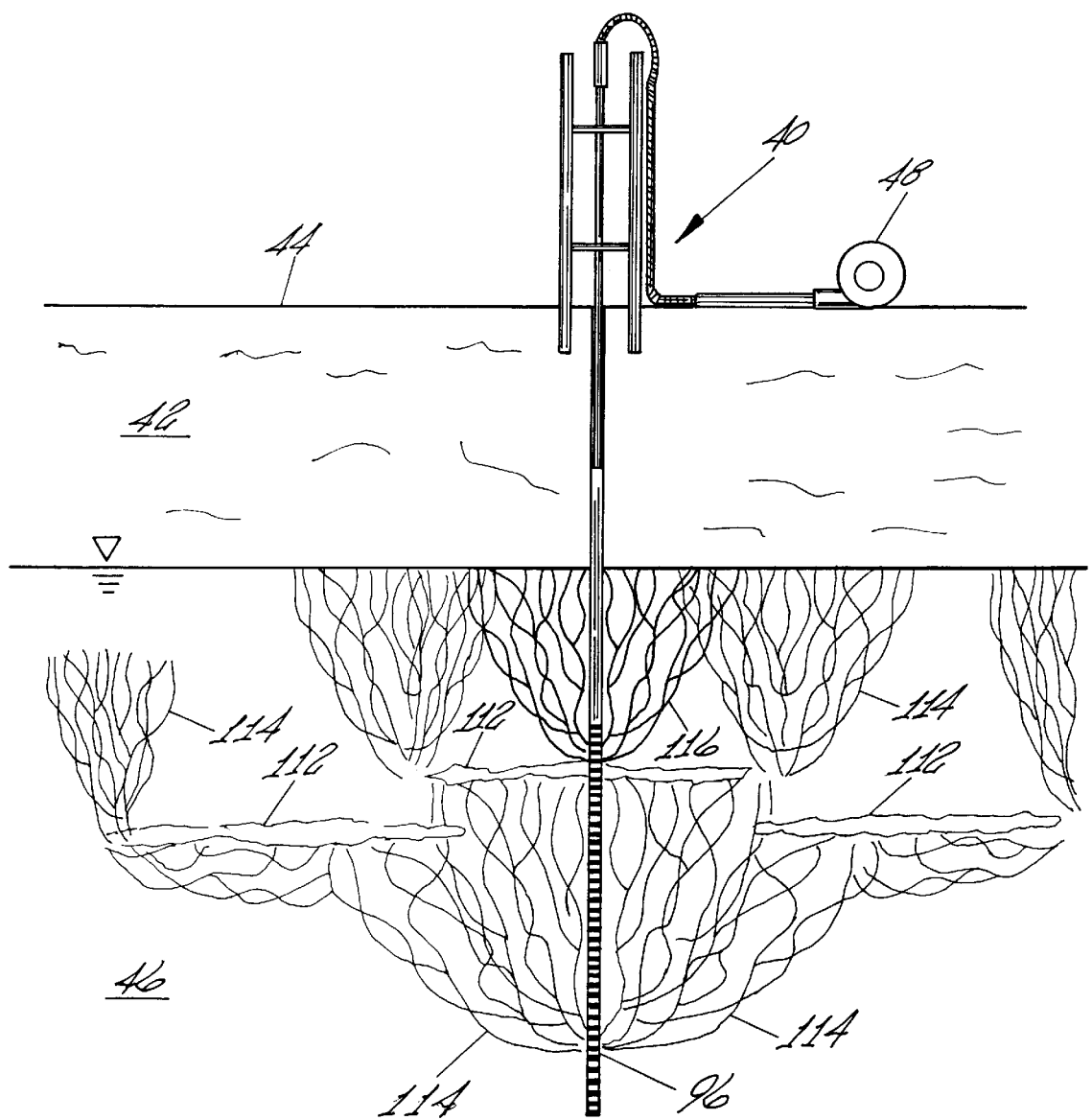
FIG. 6 illustrates the adjustable depth air sparging well of the present invention installed in a stratified saturated zone allowing for the removal of volatile contaminants from the soil's saturated zone.

Referring to FIGS. 4 and 6, FIG. 6 illustrates the adjustable depth air sparging well 40 installed in a stratified saturation zone which has a plurality of stratified layers 112. Air is first injected into the soil's saturated zone 46 at a point below the stratification which forms air channels 114. The air sparging packer 54 including one way valve 92 is moved upward above the stratification, prior to injecting air. When air is injected above the stratification while still in the soil's saturated zone 46, air channels 116 are formed. As shown FIG. 6, air channels 114 and 116 blanket the soil's saturated zone 46 removing volatile containments from the soil's saturated zone 46.

Figure 7:
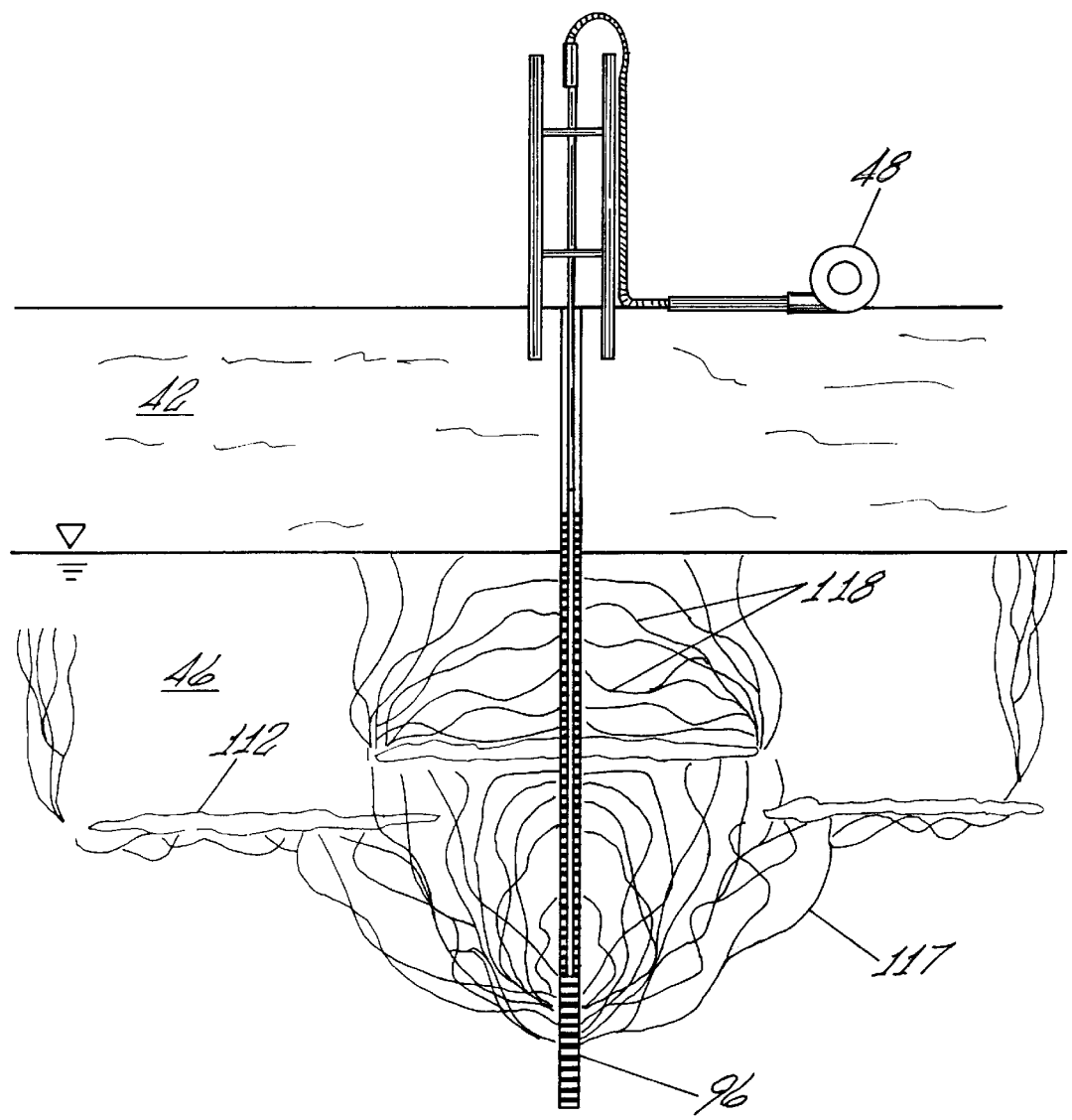
FIG. 7 illustrates the adjustable depth air sparging well of the present invention installed in a stratified saturated zone in which airflow is turned off after a period of injection.

Referring to FIGS. 4 and 7, when air injection is repeatedly pulsed through the one way valve 92 of air sparge packer 54, horizontal/diagonal air channels 118 are formed in the intervals between injection pulses from substantially vertical air channels 117 that flow towards the well screen 96 in the manner illustrated in FIG. 7. In between each injection pulse airflow from blower 48 is ceased, the seal between inflatable packer 54 and well screen 96 is broken because of packer 54 deflation. A conduit to the soil's vadoze zone 42 is formed via the screened well 96. Each time air from blower 48 ceases, horizontal/diagonal migration of air will occur. The horizontal/diagonal migration of air, as depicted by air channels 118, is caused by a pressure gradient that is developed between the air channels and the well screen. This newly developed pressure gradient is greater than and supersedes the air buoyancy pressure gradient which causes air to travel straight up. With the advent of the horizontal/diagonal air channels 118, an increased contaminant removal rate is provided.

From the foregoing, it is readily apparent that the present invention comprises a new, unique, and exceedingly useful adjustable depth air sparging well for removing volatile contaminants from saturated and groundwater regions of the soil which constitutes a considerable improvement over commercially available air sparging system which do not allow for depth adjustment of the system. Many modifications and variations of the present invention are possible in light of the above teachings. It is to be understood that within the scope of the appended claims the invention may be practiced otherwise than as specifically described.

What is claimed is:

1. An adjustable depth air sparging system for removing contaminants from a saturated zone comprising:
   a vertically oriented well casing extending downward into said saturated zone, said well casing having a screened lower portion positioned within said saturated zone;
   an air supply tube movably disposed within said well casing, said air supply tube having a plurality of openings positioned at a lower end thereof;
   air supply means for providing compressed air to said air supply tube;
   a flow through air sparge packer affixed to the lower end of said air supply tube, said flow through air sparge packer covering the openings within said air supply tube forming an air tight seal around the lower portion of said air supply tube; and
   injecting means affixed to the lower end of air supply tube to receive said compressed air, said injecting means injecting said pressurized air through the screened lower portion of said well casing into said saturated zone at a plurality of depths, forming air channels at each of said plurality of depths through which said pressurized air flows to remove said containments from said saturated zone.

2. The adjustable depth air sparging system of claim 1 wherein said air supply means comprises an air compressor.

3. The adjustable depth air sparging system of claim 1 wherein said air supply means comprises an air blower.

4. The adjustable depth air sparging of claim 1 wherein said valve means comprises a one way valve.

5. The adjustable depth air sparging system of claim 1 further comprising a flexible tube having one connected to said air supply means and an opposite end connected to said air supply tube, said flexible tube forming a passageway for supplying said compressed air from said air supply means to said air supply tube.

6. The adjustable depth air sparging system of claim 1 wherein said flow through air sparge packer is inflatable, said flow through air sparge packer when inflated by said compressed air passing through said plurality of openings holding said valve means in a fixed position within the screened lower portion of said air supply tube at one of said plurality of depths.

7. The adjustable depth air sparging system of claim 1 wherein said flow through air sparge packer is fabricated from inflatable vitron tubing.

8. The adjustable depth air sparging system of claim 1 wherein said flow through air sparge packer includes:
   first and second vitron end caps;
   a first stainless steel strapping coupled to said first vitron end cap to secure said first vitron end cap to said air supply tube; and
   a second stainless steel strapping coupled to said second vitron end cap to secure said first vitron end cap to said air supply tube.

9. An adjustable depth air sparging system for removing contaminants from a saturated zone comprising:
   a vertically oriented well casing extending downward into said saturated zone, said well casing having a screened lower portion positioned within said saturated zone;
   an air compressor for providing pressurized air;
   an air supply tube disposed within said well casing, said air supply tube having a plurality of openings positioned at a lower end thereof;
   a flexible tube having one connected to said air compressor and an opposite end connected to said air supply tube, said flexible tube forming a passageway for supplying said compressed air from said compressor to said air supply tube;
   a flow through air sparge packer affixed to the lower end of said air supply tube, said flow through air sparge packer covering the openings within said air supply tube forming an air tight seal around the lower portion of said air supply tube; and
   a one way valve affixed to the lower end of said air supply tube;
   said air supply tube being movable within said well casing allowing said one way valve to be positioned at a plurality of depths within saturated zone;
   said one way valve injecting said pressurized air through the screened lower portion of said well casing into said saturated zone at each of said plurality of depths, forming air channels at each of said plurality of depths through which said pressurized air flows to remove said containments from said saturated zone.

10. The adjustable depth air sparging system of claim 9 wherein said flow through air sparge packer is inflatable, said flow through air sparge packer when inflated by said compressed air passing through said plurality of openings holding said one way valve in a fixed position within the screened lower portion of said air supply tube at one of said plurality of depths.

11. The adjustable depth air sparging system of claim 9 wherein said flow through air sparge packer is fabricated from inflatable vitron tubing.

12. The adjustable depth air sparging system of claim 9 wherein said flow through air sparge packer includes:
   first and second vitron end caps;
   a first stainless steel strapping coupled to said first vitron end cap to secure said first vitron end cap to said air supply tube; and
   a second stainless steel strapping coupled to said second vitron end cap to secure said first vitron end cap to said air supply tube.

13. An adjustable depth air sparging system for removing contaminants from a saturated zone comprising:
   a vertically oriented well casing extending downward into said saturated zone, said well casing having a screened lower portion positioned within said saturated zone;
   an air compressor for providing pressurized air;
   an air supply tube disposed within said well casing, said air supply tube having a plurality of openings positioned at a lower end thereof;
   a flexible tube having one connected to said air compressor and an opposite end connected to said air supply tube, said flexible tube forming a passageway for supplying said compressed air from said compressor to said air supply tube;
   a flow through air sparge packer affixed to the lower end of said air supply tube, said flow through air sparge packer covering the openings within said air supply tube forming an air tight seal around the lower portion of said air supply tube;

said flow through air sparge packer being fabricated from inflatable vitron tubing; and a one way valve affixed to the lower end of said air supply tube;

said air supply tube being movable within said well casing allowing said one way valve to be positioned at a plurality of depths within saturated zone;

said one way valve injecting said pressurized air through the screened lower portion of said well casing into said saturated zone at each of said plurality of depths, forming air channels at each of said plurality of depths through which said pressurized air flows to remove said containments from said saturated zone;

said flow through air sparge packer being inflatable, said flow through air sparge packer when inflated by said compressed air passing through said plurality of openings holding said one way valve in a fixed position within the screened lower portion of said air supply tube at one of said plurality of depths.

14. The adjustable depth air sparging system of claim 13 wherein said flow through air sparge packer includes:

first and second vitron end caps;

a first stainless steel strapping coupled to said first vitron end cap to secure said first vitron end cap to said air supply tube; and a second stainless steel strapping coupled to said second vitron end cap to secure said first vitron end cap to said air supply tube.

* * * * *